Jan. 25, 1927.
H. T. YOUNG
PLOW
Filed August 3, 1925
1,615,561
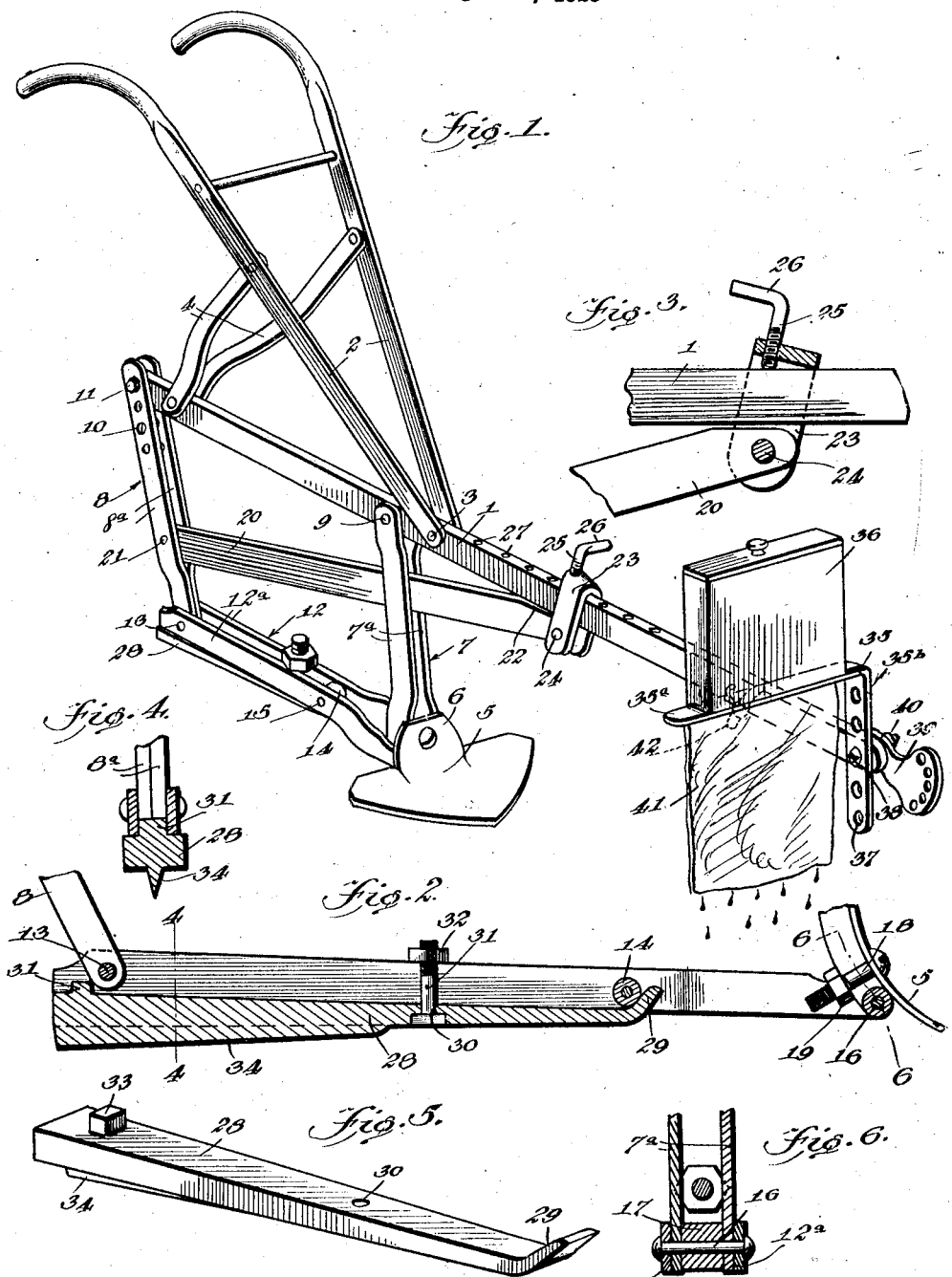
WITNESSES
INVENTOR
H. T. Young,
BY
ATTORNEYS Patented Jan. 25, 1927.

1,615,561

UNITED STATES PATENT OFFICE.

HENRY T. YOUNG, OF DARLINGTON, SOUTH CAROLINA.

PLOW.

Application filed August 3, 1925. Serial No. 47,950.

My invention relates generally to improvements in plows, more particularly to a plow of that type which comprises means for supporting a shovel blade or so-called "sweep" for use in effecting shallow cultivation of cotton or like plants, and it consists in the combinations, constructions and arrangements herein described and claimed.

An object of the invention is the provision of a plow of the character described which comprises strong, durable and easily adjusted means for adjustably supporting the blade of the plow so that the depth to which the blade will penetrate in the earth can be varied within a considerable range at will.

A further object of the invention is the provision in a plow of the character described of means for stabilizing the straight line movement of the plow blade to prevent lateral oscillatory movement or "jumping" of the plow blade.

Other objects and advantages of the invention will be apparent from the following description, considered in conjunction with the accompanying drawings, in which—

Figure 1 is a perspective view of the improved plow,

Figure 2 is a detail view, partly in side elevation and partly in longitudinal vertical section, of a portion of the structure that the invention provides for adjustably supporting the plow blade.

Figure 3 is a view similar to Figure 2, showing another portion of the plow blade supporting and adjusting structure, Figure 4 is a section along the line 4—4 of Figure 2, Figure 5 is a perspective view of a slide bar or shoe which is comprised in the device, and Figure 6 is a section along the line 6—6 of Fig. 2.

The improved plow comprises a beam 1 to which a pair of handles 2 may be attached, as at 3. The connection of the handles 2 with the beam 1 is shown as being pivotal and the handles are stayed to the beam and held against movement relatively to the beam by a pair of brace bars 4 which connect middle portions of the handles 2 with the rearward end portion of the beam 1.

The plow may comprise a shovel blade or so-called "sweep" 5 having a short attaching shank portion 6 at the rearward end thereof. It is desirable that the blade shall be adjustably suspended from the plow beam so that the angular relation thereof to the horizontal can be varied within limits to adapt the device to cultivate or penetrate the earth to various depths. The blade supporting structure includes a front standard generally indicated at 7 and a rear standard generally indicated at 8. The front standard 7 comprises a pair of bars $7^a$ having the upper end portions thereof disposed in straddling relation to the beam 1 at the rear of the connection of the handles 2 with the beam and pivotally attached to the beam by a transverse pivot element 9. The rear standard 8 also comprises a pair of bars, indicated at $8^a$. The upper end portions of the bars $8^a$ straddle the rearward end portion of the beam 1 and are provided with vertically spaced pairs of aligned transverse openings 10 for the reception of a transverse pivot element 11 for adjustably connecting the upper end portions of the bars $8^a$ with the rearward end portion of the beam 1.

The lower end portions of the standards 7 and 8 are connected by a link generally indicated at 12 which comprises a pair of bars $12^a$ disposed vertically edgewise and having their rearward end portions arranged to straddle the lower end portions of the bars $8^a$ and being pivotally attached to the latter by a transverse pivot element 13. A spacer 14 is secured between the bars $12^a$ by means of a transverse fastening device 15 at a point somewhat nearer to the forward end of the link 12 than to the rearward end of said link. The lower end portions of the bars $7^a$ of the front standard are spread apart a distance greater than that between the major portions of said bars and the forward end portions of the bars $12^a$ are spread a slightly greater distance apart to straddle the lower end portions of the bars $7^a$ and are pivotally attached to the lower end portions of the bars $7^a$ by a transverse pivot element 16. A spacer 17 is supported on the transverse pivot elements 16 between the lower end portions of the bars 7ª to prevent the lower end portions of the bars 7ª from sliding toward each other on the pivot elements 16, thus producing a space of considerable area between the connected together portions of the bars 7ª and 12ª. The shank 6 of the blade 5 therefore may be relatively short without rendering the operation of attaching the shank 6 to the front standard 7 difficult of accomplishment since ample space is provided between the connected together end portions of the bars 7ª and the bars 12ª for the reception of the rearward end portion of the shank of a bolt 18 and a nut 19 which is in threaded engagement with the rearward end portion of the shank of the bolt 18, whereby the shank of the bolt 18 can be projected through an opening in the shank 6 of the cultivator blade and rearwardly between the lower end portions of the bars 7ª and engaged with the nut 19 which can be conveniently manipulated in the space between the forward end portions of the bars 12ª and tightened against the rearward edges of the lower end portions of the bars 7ª of the front standard to clamp the shank of the blade firmly against the front edges of the lower end portions of the members of the standard 7.

An adjusting bar 20 has the rearward end portion thereof disposed between the bars 8ª of the rear standard 8 slightly nearer to the lower end of the standard than to the upper end thereof and is pivotally connected with the bars 8ª by a transverse pivot element 21. The adjusting bar 20 is of sufficient length to extend slidably between the bars 7ª of the front standard and to terminate at its forward end at a considerable distance in advance of the front standard. The upper edge of the adjusting bar 20 may be beveled as indicated at 22 to slide flatwise against the lower face of the beam 1. A clevis or substantially inverted U-shaped attaching slide member 23 has the arms thereof disposed in straddling relation to the beam 1 and to the forward end portion of the adjusting bar 20 and is pivotally attached to the forward end portion of the adjusting bar 20 by a transverse pivot element 24. A set screw 25 has the shank thereof threaded through an opening in the web portion of the member 23 and preferably has a laterally turned handle portion 26 which can be conveniently manipulated to tighten the shank of the set screw against the upper edge or face of the beam 1 or to loosen the set screw when desired. The upper edge portion or face of the beam 1 preferably has a longitudinally extending series of spaced sockets or recesses 27 formed therein, each of which is adapted to receive the lower end portion of the shank of the set screw 25 when the latter has been tightened so that the member 23 can be firmly held in any one of a plurality of different positions along the beam 1. It is obvious that the angle of inclination of the blade 5 to the horizontal and therefore the depth to which the point of the blade will penetrate into the earth can be varied within a considerable range by sliding the member 23 along the beam 1 after the set screw 25 has been loosened and that the plow blade will be firmly held against movement relatively to the beam 1 when the set screw 25 has been tightened to lock the clevis 23 to the beam in adjusted position on the latter. The provision of the vertically spaced pairs of aligned openings 10 in the members 8ª of the rear standard 8 in conjunction with the pivot element 11, which may be the shank of a bolt and nut arrangement, and a transverse opening in the rearward end portion of the beam 1 permits further adjustment of the angular relation of the blade 5 to the horizontal, if desired.

A slide bar or shoe for stabilizing the straight line movement of the plow blade and for preventing lateral jumping or oscillatory movement of the plow blade is indicated at 28 in Figures 1, 2 and 5 of the drawing. This slide shoe decreases in width and also in thickness from its rearward end to its forward end so that the forward end portion of the slide bar which is inclined upwardly and forwardly as indicated at 29, is adapted to fit between the bars 12ª in advance of the spacer 14 and in contact with the latter as clearly shown in Figure 2 while the portion of the slide bar which extends rearwardly of the spacer 14 is of greater width than the distance between the corresponding portions of the bars 12ª and is in contact adjacent to its side edges with the lower edges of such portions of the bars 12ª. The slide bar 28 has a vertical opening 30 formed therein intermediate its length for the reception of the shank of a bolt 31 which extends upwardly between the members 12ª and is in threaded engagement with a nut 32. The opening 30 is enlarged at its lower end for the reception of the head of the bolt so that the lower face of the bolt head will be flush with the lower face of the slide shoe 28 and the nut 32 can be tightened against the upper edges of the bars 12ª to clamp the slide shoe to the lower edges of the bars 12ª firmly. The slide shoe has an upstanding projection 33 adjacent to the rearward end thereof and intermediate the side edges thereof. This projection 33 extends upwardly between the rearward end portions of the bars 12ª and engages with the inner faces of such bars to cooperate with the bolt 31 and nut 32 and with the upturned forward end portion 29 of the slide shoe to prevent lateral movement of the slide shoe relatively to the link 12. The slide shoe 28 is formed with a longitudinally extending stabilizing vane or rib 34 which extends on the lower face of the slide shoe along the longitudinal median line of the latter from the rearward end of the slide shoe slightly more than half the length of the slide shoe. This rib 34 has a sharp lower edge and decreases in thickness from its rearward end to its forward end. The rib 34 of the slide shoe will bite into the earth when the plow is drawn forward and will tend to prevent the blade from swinging or "jumping" laterally. It is obvious that adjustment of the rear standard 8 vertically relatively to the plow beam 1 will effect vertical adjustment of the rib 34 of the slide shoe with respect to the level to which the point of the blade 5 will penetrate in the earth.

A bracket 35 has a horizontal arm 35$^a$ on which a receptacle 36 for liquid insecticide is secured. A vertical arm 35$^b$ of the bracket is formed with a longitudinally extending series of openings 37. A bolt 38, which may be the same bolt that is used to secure a coupling plate 39 or a clevis to the forward end portion of the beam 1, can be projected through any one of the openings 37 to secure the arm 35$^b$ of the bracket against a side face of the forward end portion of the beam 1. The bolt 38 of course is engaged by a nut, such as indicated at 40. A flexible apron or wiper member 41 depends from the horizontal arm 35$^a$ and is made of a suitable fabric or other material adapted to retain moisture a considerable length of time. The receptacle 36 is adapted to hold any suitable liquid insecticide which is fed from the receptacle 36 through a spout 42 or other suitable outlet onto the wiper member 41 and thence is transferred to the plants with which the wiper member comes in contact during the operation of the plow. Plants, such as cotton plants, therefore may be treated with a suitable liquid insecticide at the time the cultivation of such plants in the field is effected.

Obviously, the invention is susceptible of embodiment in forms other than that which is illustrated in the accompanying drawing and I therefore consider as my own all such modifications and adaptations thereof as fairly fall within the scope of the appended claims.

I claim:—

1. In a plow, a beam, a front standard comprising a pair of bars having the upper end portions thereof arranged to straddle said beam and pivotally attached to said beam, a rear standard comprising a pair of slide bars having the upper end portions thereof provided with vertically spaced pairs of aligned openings, a pivot element for connecting the upper end portions of the bars of said rear standard adjustably with the rearward end portion of said beam, a link connecting the lower end portions of the bars of said rear standard with the lower end portions of the bars of said front standard, a shovel blade secured against the forward edges of the lower end portions of the bars of said front standard, a rigid adjusting bar having the rearward end portion thereof disposed between the bars of the rear standard and pivotally attached to said bars, said rigid adjusting member extending slidably between the bars of the front standard and lying in the plane of said beam, an inverted U-shaped member having the arms thereof straddling said beam and pivotally attached to the forward end portion of said rigid adjusting member, said inverted U-shaped member being slidable along said beam, and means for locking said inverted U-shaped member to said beam.

2. In a plow, a beam, a front standard comprising a pair of bars having the upper end portions thereof arranged to straddle said beam and pivotally attached to said beam, a rear standard comprising a pair of slide bars having the upper end portions thereof provided with vertically spaced pairs of aligned openings, a pivot element for connecting the upper end portions of the bars of said rear standard adjustably with the rearward end portion of said beam, a link connecting the lower end portions of the bars of said rear standard with the lower end portions of the bars of said front standard, a shovel blade secured against the forward edges of the lower end portions of the bars of said front standard, a rigid adjusting bar having the rearward end portion thereof disposed between the bars of the rear standard and pivotally attached to said bars, said rigid adjusting member extending slidably between the bars of the front standard and lying in the plane of said beam, an inverted U-shaped member having the arms thereof straddling said beam and pivotally attached to the forward end portion of said rigid adjusting member, said inverted U-shaped member being slidable along said beam, and a set screw threaded through the web of said inverted U-shaped member against said beam and adjustable to lock said U-shaped member to the beam or to release the U-shaped member for movement along the beam, said beam having a longitudinally extending series of spaced recesses for the reception of the adjacent end portion of said set screw.

3. In a plow, a beam, a pair of spaced standards pivotally attached at their upper ends to said beam, a blade carried at the lower end of said front standard, a link comprising a pair of bars straddling the lower end portions of said standard and pivotally attached thereto, means for connecting one of said standards with said beam, a slide shoe having an elongated body decreasing in thickness and width from its rearward end to its forward end, the forward end portion of said slide shoe being upturned to extend between the bars of said link, means for clamping said slide shoe to the bars of said link, and a longitudinal rib on the lower face of said slide shoe extending from the rearward end of said slide shoe for part of the length of the latter and having a sharp cutting edge adapted to bite into the earth, said rib decreasing in thickness from its rearward end to its forward end.

HENRY T. YOUNG.